United States Patent Office 3,618,237
Patented Nov. 9, 1971

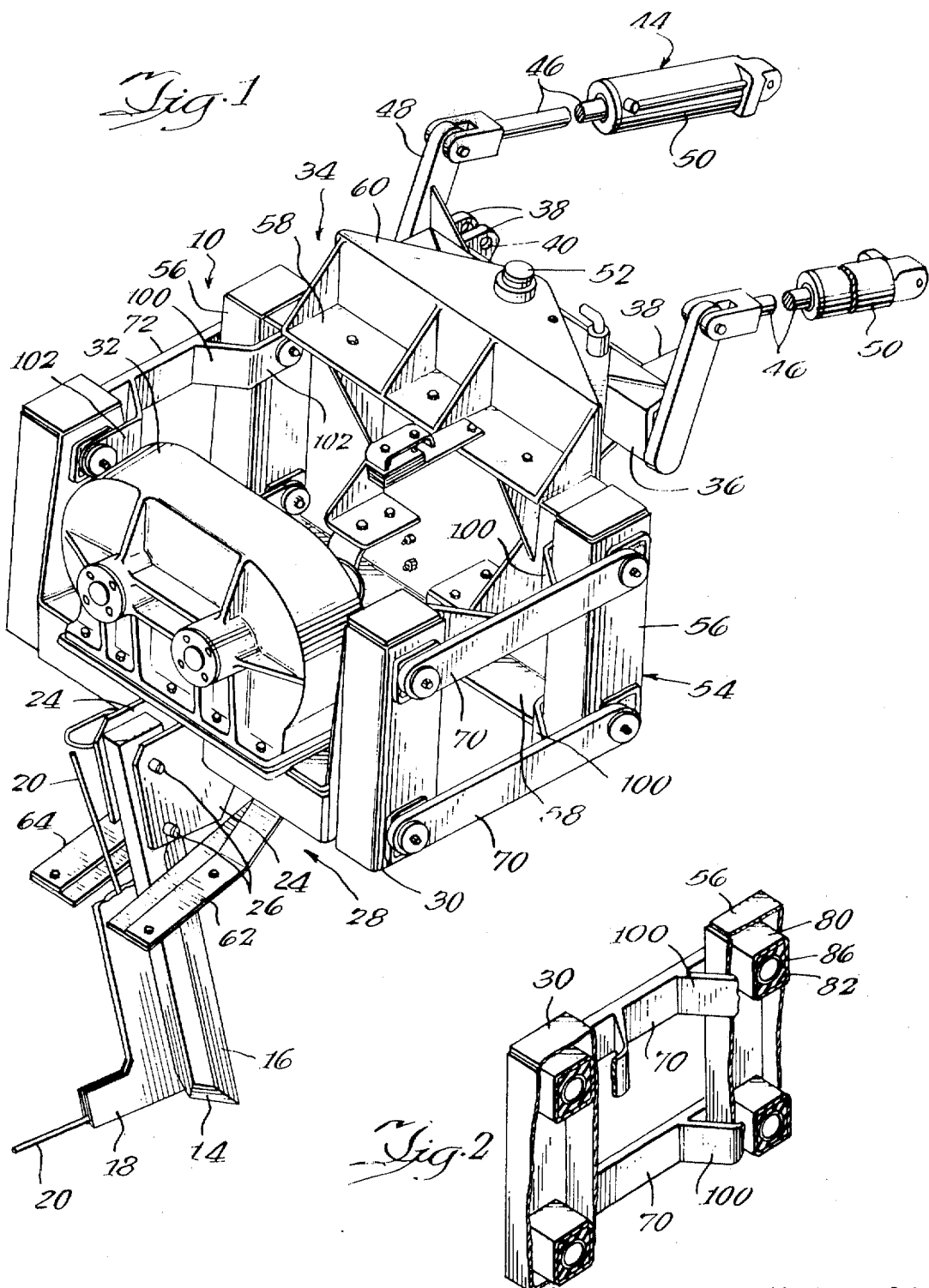

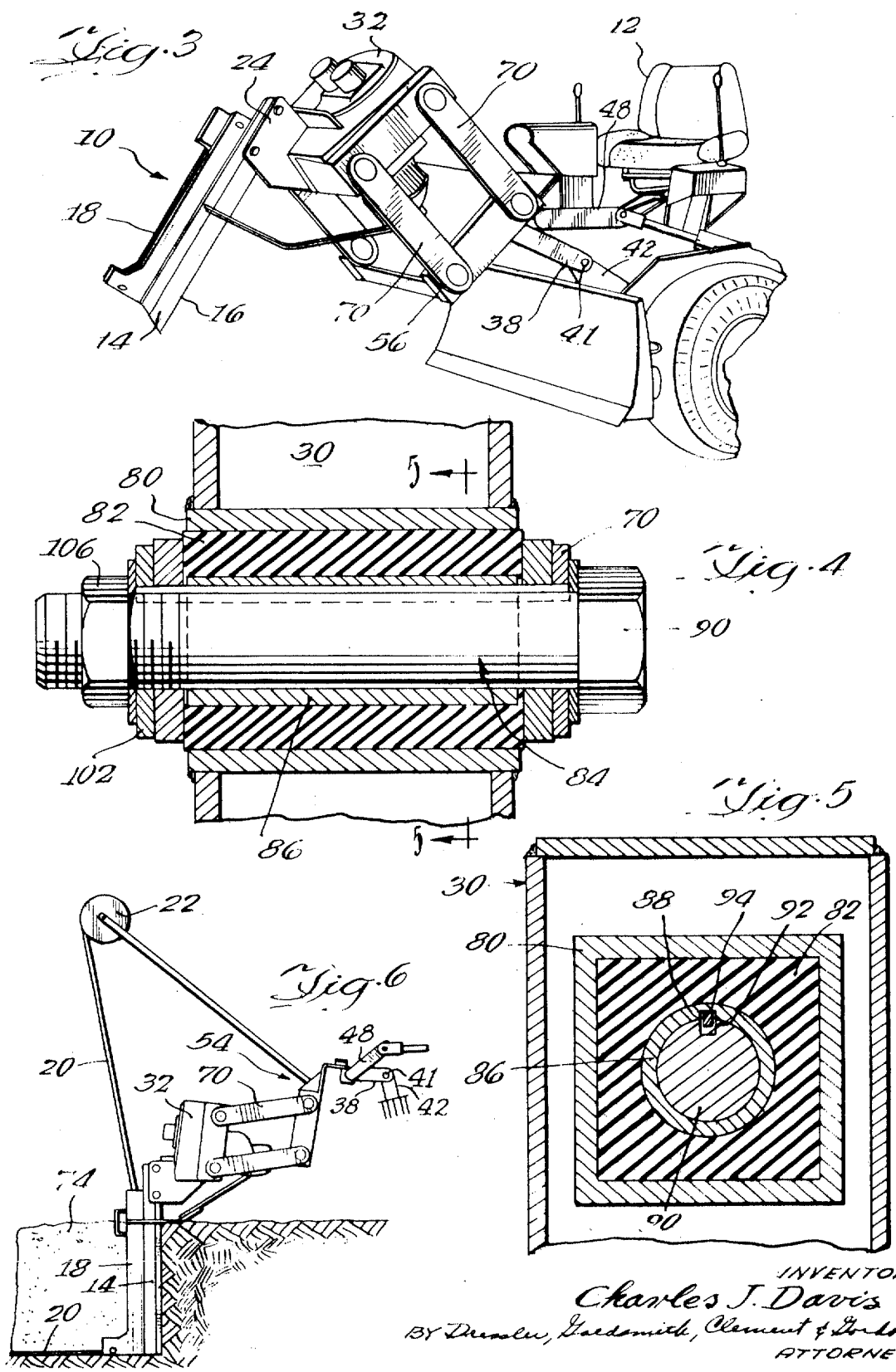

3,618,237
UNDERGROUND CABLE LAYING IMPLEMENT
Charles J. Davis, Wichita, Kans., assignor to
J. I. Case Company
Filed Nov. 3, 1969, Ser. No. 873,152
Int. Cl. E02f 5/02; F16l 1/00
U.S. Cl. 37—98
4 Claims

ABSTRACT OF THE DISCLOSURE

A vehicle supported implement which has an elongated, thin, flat blade fixed to an oscillating mechanism carried by a support. The blade is rapidly reciprocated to form a deep, narrow, continuous slit and supports a cable guide to simultaneously lay a continuous length of cable along the bottom of the slit. The support is isolated from a frame on the vehicle by torque cushioning elements each including an elastic member bonded to an inner member which is connected to each end of links extending between the frame and the support. Each elastic member is fixedly secured to either the frame or the support so that the elastic members absorb the reciprocal movement of the support and substantially isolate the frame from the support.

BACKGROUND OF THE INVENTION

The present invention relates generally to an implement for laying a continuous length of cable at a desired depth beneath the ground surface, and more particularly to improved mechanism for supporting the implement relative to a vehicle.

For years it had been considered necessary in laying continuous cable to use a powered trench digging machine which formed a trench of the desired depth at which the cable was to be located. Subsequently, the cable was inserted along the bottom of the trench and the trench was filled by hand or with some other powered machine. This method required three separate steps for laying a cable.

In recent years, applicant developed an implement which forms a continuous, narrow slit in the ground and simultaneously feeds the cable downwardly into the bottom of the slit with all of the ground engaging mechanism being of relatively small dimension so as to eliminate the necessity for subsequent filling of the opening or trench in which the cable was buried. This implement includes a novel arrangement for isolating the vibration of the slit forming knife from the cable guiding mechanism, thereby preventing damage to the machine and to the sensitive lines. Such an implement is disclosed and claimed in applicant's Pat. No. 3,363,423.

While the above mentioned underground cable laying implement has met with considerable commercial success, it has been found that prolonged operation of the implement by an operator results in a considerable degree of irritation and discomfort to the operator. This irritation of the operator is caused by the transfer of the oscillating movement of the slit forming blade to the vehicle. While such oscillation or vibration of the vehicle does not impair the operation of the cable laying implement, manufacturers are continually striving for producing equipment which not only performs its intended function, but also which is substantially free of any distractions to the operator.

BRIEF SUMMARY OF THE INVENTION

The present invention relates to an improvement for the underground cable laying implement of the type disclosed in the above mentioned patent and which includes slit forming blade supporting a cable guide, with the blade being reciprocated vertically by an oscillating mechanism carried on a support and secured to the blade. The support is pivotally mounted on a frame through a parallelogram linkage system and the frame is adjustably supported on a vehicle having an operator station thereon.

The present invention contemplates completely isolating the frame from the support for the implement which includes the oscillating mechanism, the elongated slit forming blade and the cable guide. This is accomplished by elastic torque cushioning elements forming the connection between the opposite ends of the links of the linkage system and the support and frame, respectively. Each of the cushioning elements includes a rectangular outer member and a circular inner member or sleeve with an elastic member being positioned between the outer and inner members. The outer members are fixedly or non-rotatably supported on the frame and support, respectively, while the inner members are non-rotatably connected to the ends of the respective links.

The elastic members cooperate to absorb any movement of the support relative to the frame which is within the limits of reciprocal movement of the blade. This particular feature is of considerable significance to allow adjustment of the depth of cut of the blade by adjustment of the frame relative to the vehicle.

BRIEF DESCRIPTION OF THE SEVERAL VIEWS OF THE DRAWINGS

FIG. 1 is a perspective view of the cable laying implement with the present invention incorporated therein;

FIG. 2 is a fragmentary, broken perspective view of one side of the frame and support of the implement shown in FIG. 1;

FIG. 3 is a perspective view similar to FIG. 1 showing the implement attached to a vehicle and located in its transport position;

FIG. 4 is an enlarged sectional view through one of the connections for the links;

FIG. 5 is an enlarged vertical sectional view taken generally along lines 5—5 of FIG. 4; and FIG. 6 is a schematic illustration of the implement in its operative position in the ground.

DETAILED DESCRIPTION

While this invention is susceptible of embodiment in many different forms, the following detailed description and the attached drawings disclose one specific embodiment with the understanding that the present disclosure is to be considered as exemplary and is not intended to limit the invention to the embodiment illustrated.

FIG. 3 of the drawings discloses a cable laying implement 10 supported on a vehicle 12, only a portion of which is shown in the drawings. The underground cable laying implement 10 includes a flat, elongated blade 14 having a vertical ground slitting edge 16 at the forward end thereof. The elongated, thin, flat generally upright blade has a cable guide 18 supported thereon by two pairs of short links ( not shown) with the cable guide receiving a cable 20 which is continuously fed from a storage drum 22 (FIG. 6) into and along the bottom of the ground slit formed by the blade.

The upper end of the blade 16 is fixedly supported between transversely spaced plates 24 by pins 26. The transversely spaced plates 24 are fixedly connected to a support 28 having vertically extending transversely spaced columns 30 for a purpose which will be described later. The support 28 has a power driven oscillating or reciprocating mechanism 32 supported thereon. While not limited to any particular type of oscillating mechanism, one form of mechanism which may be utilized is the type disclosed in the above mentioned patent, the entire disclosure of which is incorporated herein by reference.

The blade 16, the cable guide 18, the support 28 and the oscillating mechanism 32 are suspended and adjustably secured to the vehicle through a frame 34. The frame 34 comprises a transversely extending beam 36 having spaced lugs 38, each of which has an opening 40 receiving a pin 41 (FIG .3) for pivotal support on arms 42 defined on the vehicle. The beam 36 is adapted to be pivoted about the axis of the pins 41 through suitable fluid rams 44 having their piston rods 46 pivotally connected to an upwardly extending arm 48 integral with the beam and a cylinder 50 pivotally supported on the vehicle 12. An inspection of FIG. 1 of the drawings shows that the pivotal connections of the piston rods to the upwardly extending arms 48 is at a location that is spaced from the pivot pins 41. Thus, extension and retraction of the piston rods 46 will cause pivotal movement of the beam about the axis defined by the pins 41 received in openings 40.

The transversely extending beam 36 supports an upright pin 52 which has a frame element 54 pivoted about the vertical axis of the pin. The frame element 54 consists of a pair of transversely spaced, vertically extending columns 56 suitably interconnected by upper and lower plates 58 which have horizontal supporting members 60 (only one being shown) extending therefrom and receiving the pivot pin 52.

The underground cable laying mechanism further includes means for preventing dirt and clods from being pulled out of the ground adjacent the slit being formed by the blade. This means is disclosed and described in more detail in the above mentioned patent and includes a pair of heavy leaf springs 62 and 64, each of which has one end rigidly secured to the frame element 54 and the opposite end supporting ground engaging plates.

The transversely spaced, vertically extending columns 30 and 56 are interconnected through first and second pairs of vertically spaced links 70 and 72. Each of the links has one end supported on a column 56 and an opposite end supported on a column 30. The respective links cooperate to define a parallelogram linkage between the support 28 and the frame element 54.

The above described mechanisms cooperate in the manner disclosed in the above mentioned patent to produce a continuous, narrow slit in the ground and simultaneously lay a continuous length of cable 20 into or along the bottom of the blade-formed slit. This is accomplished by reciprocating the blade 14 vertically between upper and lower limits by the oscillating mechanism 32, as is set forth in more detail in the above mentioned patent.

As was indicated above, while the underground cable laying implement of this type has found considerable commercial success, no provision is made for isolating the support 28 from the frame 54 so as to preclude the transfer of the vibrations from the oscillating mechanism to the vehicle and therefore to the operator. While most of these vibrations are absorbed within the linkage system between the support 28 and the frame element 54 when the ground engaging blade is operating at full depth, in many instances it becomes necessary for the operator to provide an additional force downwardly on the blade so as to operate at a particular depth. Also, at other times, it is desirable to operate the implement in a manner to produce a slit which has a depth less than the full depth or length of the blade by selective actuation of the fluid rams 44. Proper adjustment of the length of the rams 44 will determine the depth of the slit to be cut by the blade. In these instances, it is necessary to have a substantially fixed relationship between the frame 54 and the support 28. However, with such a fixed relationship, the vibrations or oscillations of the vibrating mechanism 32 are transferred to the vehicle 10.

According to the present invention, the interconnection between the frame or first support 54 and the second support 28 includes a plurality of elastic torque cushioning elements which are respectively located between each of the ends of the links and the associated column. One elastic torque cushioning element is shown in detail in FIGS. 4 and 5.

The elastic torque cushioning element includes an outer member 80 fixedly secured to one of the columns 30 or 56 with the outer member or housing 80 non-rotatably supporting an elastic member 82. The illustrated elastic torque cushioning element further includes a hollow inner member 84 which is fixedly secured to the elastic member 82. The inner member 84 is preferably a sleeve 86 which is bonded to the elastic member 82, with the sleeve having an axially extending key-way 88 formed therein. The sleeve 86 receives a pin or bolt 90 having a cooperating key-way or slot 92. The pin 90 and sleeve 88 are non-rotatably interconnected through the key 94 received in the respective key-ways 88 and 92.

Each end of each of the links 70 and 72 has a bifurcated portion defined by a plate 100 having an end portion 102 extending parallel to and transversely spaced from the end of the main body of the link 70 or 72. A nut 106 is threaded on the end of each pin 90 to hold the parts in assembled relation.

Thus, it will be seen that the respective torque cushioning elements interposed between the linkage means consisting of links 70 and 72 and the support 28 and frame 54 will absorb the vibrations of the ground laying implement which are transmitted by the oscillating or reciprocating mechanism 32. In an exemplary embodiment, blade 14 has an amplitude of 1½ inches, and this movement is entirely absorbed by cushioning members 82 so that no vibrations are transmitted to the operator of the implement.

According to another aspect of the invention, the eight elastic torque cushioning elements are designed and dimensioned to accommodate only a relative movement between the support and the frame which is equal to the dimension between the maximum upper and lower limit of movement of the blade. This feature is of importance in providing an acceptable cable laying implement which is capable of forming slots of varying depth. Furthermore, this particular arrangement is important when it is necessary to force the blade into the ground while it is being vibrated or to lift the blade out of the ground during the reciprocation or oscillation.

With the cushioning elements constructed in this manner, the blade may be operated at any depth or may be forced into the ground so that the frame 54 is still substantially isolated from the support 28.

I claim:

1. In combination with a vehicle having forward and rear ends and an implement capable of forming a tapered, narrow, continuous slit comprising: a first support; means for connecting said first support adjacent one end of said vehicle; fluid motor means connected between said vehicle and first support for raising and lowering said first support on said vehicle; a linkage system including a plurality of links, each link having one end pivotally connected to said first support and extending away from said vehicle with opposite ends spaced from said support; a second support pivotally connected to the opposite ends of said links; a power-driven oscillating mechanism fixedly mounted on said second support; an elongated blade having its upper end connected to said oscillating mechanism for vertically reciprocating said blade, second support and oscillating mechanism between upper and lower limits relative to said first support; and elastic torque cushioning elements interposed between said links and said supports for absorbing oscillation of said second support relative to said first support when said blade is reciprocated by said oscillating mechanism so that said blade, oscillating mechanism and second support are vertically reciprocated upon actuation of said oscillating mechanism, said elastic torque cushioning elements defining a maximum upper and lower limit of movement of said blade so that said blade may be operated at any depth relative to the ground and a positive ground engaging force may be applied to said blade by proper adjustment of the length of said fluid motor means.

2. An implement as defined in claim 1, in which each of said cushioning elements includes a rectangular outer member and a circular inner member with an elastic member connected to said members, said inner members supporting said opposite ends of said linkage means and respective outer members fixed to said first support.

3. An implement as defined in claim 2, including the further improvement of each said inner members comprising a sleeve bonded to said elastic member and a pin fixed within said sleeve, said pin extending from said sleeve with the respective ends of said linkage means connected to the respective pins for movement therewith.

4. An implement as defined in claim 1, in which said supports each have a pair of transversely spaced columns and said linkage means comprises first and second pairs of links each having one end connected to a column, said links cooperating to define a parallelogram linkage between said supports; each said cushioning elements comprising a rectangular outer member fixed to a column; an elastic member received in said outer member and an inner sleeve fixed to said elastic member, said sleeve having a pin secured therein and connected to an end of one of said links.

References Cited
UNITED STATES PATENTS

| | | | |
|---|---|---|---|
| 2,045,978 | 6/1936 | Burton | 287—85 R X |
| 2,850,815 | 9/1958 | Edwards | 61—72.6 X |
| 3,363,423 | 1/1968 | Davis | 61—72.6 |
| 3,482,464 | 12/1969 | Reich et al. | 278—85 R X |
| 3,516,260 | 6/1970 | Wood | 61—72.6 |
| 3,036,858 | 5/1962 | Fingerut | 287—85 R X |

THOMAS F. CALLAGHAN, Primary Examiner

D. H. CORBIN, Assistant Examiner

U.S. Cl. X.R.

37—193, DIG. 18; 61—72.6; 172—40